Dec. 2, 1958   J. E. SCHEIDEGGER   2,862,761
ADJUSTABLE TOEBOARDS
Filed Aug. 1, 1957
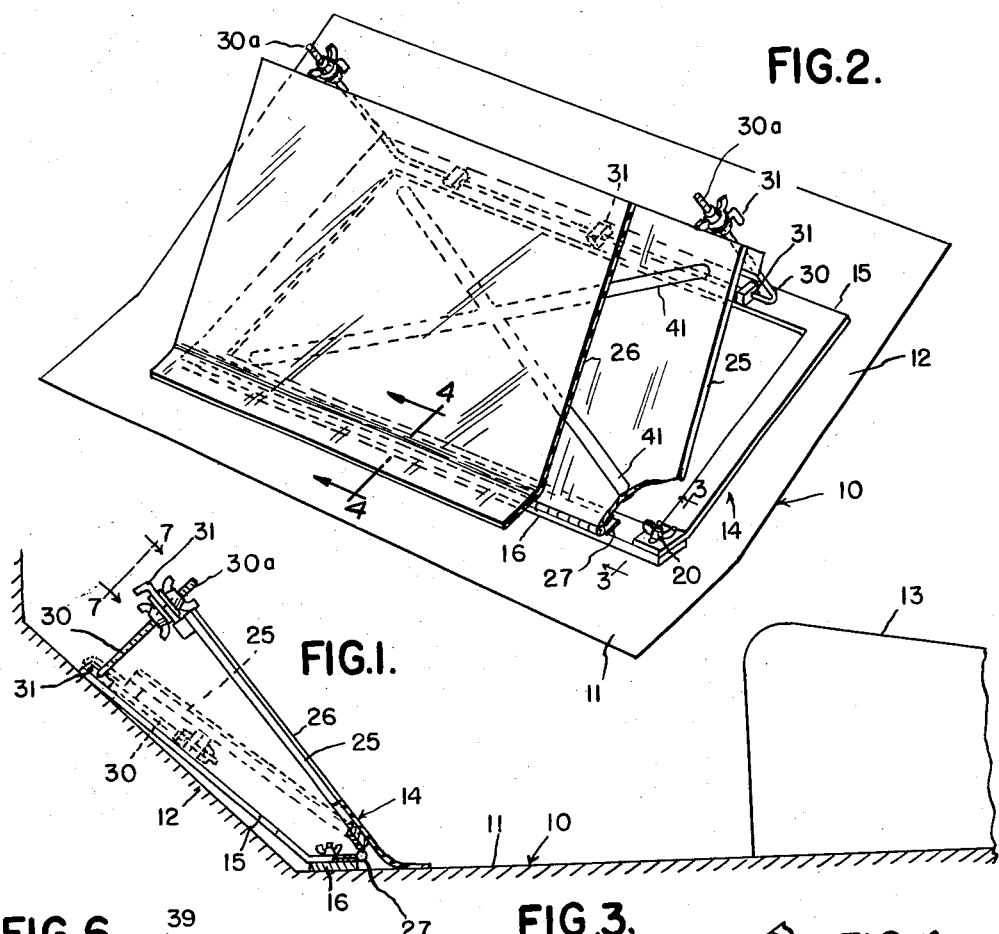
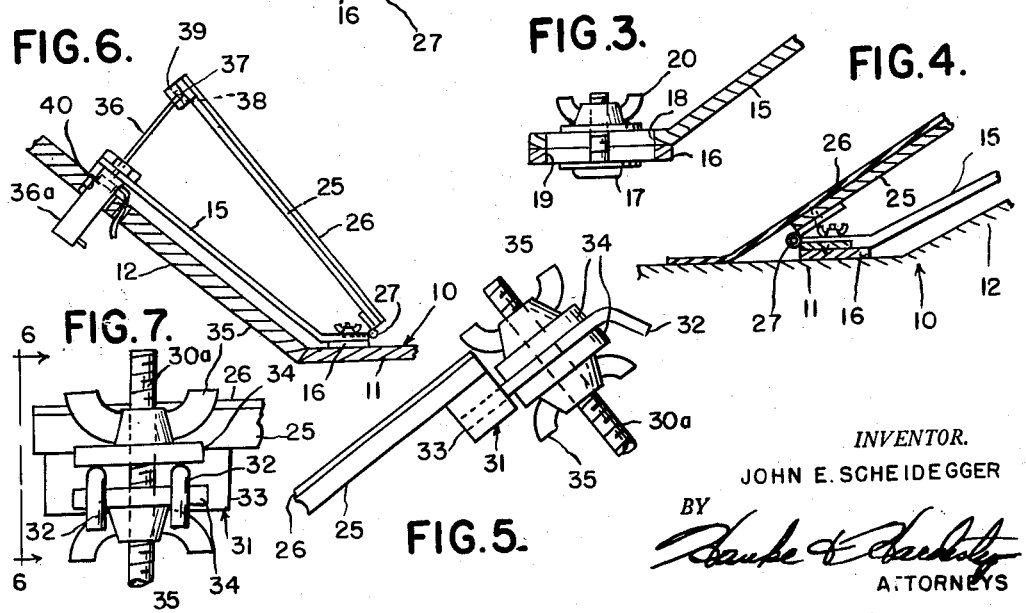
INVENTOR.
JOHN E. SCHEIDEGGER
BY
ATTORNEYS

United States Patent Office 2,862,761
Patented Dec. 2, 1958

2,862,761

ADJUSTABLE TOEBOARDS

John E. Scheidegger, Detroit, Mich.

Application August 1, 1957, Serial No. 675,696

5 Claims. (Cl. 296—75)

My invention relates to vehicle accessories and more particularly to a portable adjustable toeboard constructed to be placed in the vehicle and adjusted to compensate for differences in occupants' varying foot support requirements.

The present invention is adaptable particularly to automotive vehicles to provide a foot support for passengers in the front seat. It is often noted that shorter persons riding in modern automobiles become tired, especially on long rides, and it has been observed that the reason for discomfort lies in the fact that, having no convenient toeboard to provide foot support, the shorter person's weight is unevenly distributed, posture is poor, and back pains are the usual result. The modern automobile, having lower seats, are provided with longer leg areas, and the passenger's legs, rather than extending down to the floor, as was the case in older vehicles, must be stretched out and unless some brace for the feet is provided, acute discomfort results.

Moreover, and perhaps of more importance from the safety standpoint, the passenger riding beside the driver is in the most dangerous position in case of collision, and it is a known fact that many serious injuries could be averted if this passenger were able to brace himself against impact forces.

An object of the present invention is to increase vehicle passenger comfort and safety by providing a portable adjustable toeboard adapted to rest on the vehicle floor and serve as a foot support.

Another object of the invention is to provide a convenient vehicle accessory by constructing a portable toeboard having a platform variably selectively inclined with respect to the vehicle floor and adjustable toward and away from the passenger seat to accommodate various passenger foot support requirements.

A further object of the invention is to provide a convenient foot support for vehicle passengers by constructing a support structure adapted to rest solidly against the vehicle floor and having an adjustable platform, the structure being readily collapsed for portability.

For a more complete understanding of the invention, reference may be had to the accompanying drawing illustrating preferred embodiments of the invention in which like reference characters refer to like parts throughout the several views and in which—

Fig. 1 is a fragmentary sectional view of a vehicle interior illustrating the structure of the present invention in place on the floor.

Fig. 2 is a perspective view of the adjustable toeboard.

Fig. 3 is a fragmentary cross-sectional view taken substantially on the line 3—3 of Fig. 2, Fig. 4 is a fragmentary cross-sectional view taken substantially on the line 4—4 of Fig. 2.

Fig. 5 is a fragmentary view of the locking means of Figs. 1 and 2 taken from the line 6—6 of Fig. 7.

Fig. 6 is a side elevational view of a modified construction, and

Fig. 7 is a fragmentary view taken substantially from the line 7—7 of Fig. 1.

A section of an automobile or other vehicle floorboard 10 is illustrated as comprising a substantially horizontal floor section 11 and an inclined toeboard section 12 spaced from a seat 13 disposed on the floorboard 10 substantially as shown.

A preferred embodiment of a portable adjustable floorboard structure 14 is illustrated as comprising a base frame support member 15 and a bracing member 16 preferably adjustably secured thereto by any means such as bolts 17 extending through slots 18 and 19 in the support member 15 and bracing member 16 respectively and secured by a wing nut 20 as shown in Fig. 3. It is seen that the frame and bracing members are contoured to substantially conform with the toeboard 12 and floor 11 respectively, the bracing member 16 providing support to hold the frame member 15 in its inclined position.

A platform 25, preferably having a floor-mat 26 secured thereto, is hinged by any means such as a piano hinge 27 to the bracing member 16. It will be seen that the bracing member 16 may be selectively adjusted toward and away from the seat 13, thus shifting the platform 25 back and forth to accommodate varying leg room required by individual passengers.

The platform may be selectively supported in varying inclined positions relative to the floorboard 10 by any suitable means. One such means is illustrated in Figs. 1, 2, 5 and 7 as comprising a rod 30 pivotally mounted on the frame member 15 by any means such as mounting blocks 31 and having screw threaded ends 30a. Each end 30a is selectively adjustably secured to a keeper assembly 31 comprising a pair of hook shaped elements 32 mounted to a block element 33. The hook elements are selectively clamped between washers 34 and wing nuts 35 on the rod end 30a, the wing nuts 35 being axially adjustable on the rod end 30a selectively disengaged from the elements 32 to permit the rod 30 to be folded inward and the platform 25 collapsed as illustrated by the dotted line positions of Fig. 1.

The platform 25 may be selectively raised and lowered to various positions by other means such as a piston 36 operated by a hydraulic or pneumatic cylinder 36a and having an end pin 37 riding in a slot 38 of a bracket 39 mounted on the platform 25, as illustrated in Fig. 6. The cylinder may be carried by the frame 15 and extend through a hole 40 in the toeboard 12.

The platform 25 thus provides an auxiliary portable toeboard for the feet of a passenger sitting in the seat 13, whose feet normally would not reach to toeboard 12, and is selectively adjustable both laterally and angularly to accommodate various requirements. The platform 25 should be of rigid construction preferably having ribs 41 or other strengthening structure, so as to provide sufficient support of a person's weight which may be thrust against it at any time.

Although I have described only two embodiments of the invention, it will be apparent to one skilled in the art to which the invention pertains that various changes and modifications may be made therein without departing from the spirit of the invention or the scope of the appended claims.

I claim:

1. A unitary supplemental toeboard for a vehicle having a seat, a substantially horizontal fixed floorboard and a fixed toeboard upwardly inclined from said floorboard and spaced forwardly of said seat, said supplemental toeboard comprising a movable unitary frame structure having rear and forward portions disposed in a fixed angular position at all times with respect to each other and seated respectively on said fixed floorboard and fixed toeboard, whereby to firmly position said frame structure substantially relatively complementary to said fixed floorboard and fixed toeboard, a toeboard tread member hinged to said frame structure rear portion, and an adjustable support member carried by said frame structure forward portion and selectively secured to a portion of said tread member spaced from the hinge, said support member comprising a rod hinged to said forward portion, a connecting element carried solely by said rod, said connecting element constructed and arranged to be selectively clamped to said tread member and to be selectively secured at any longitudinal position on said rod to support said tread member at selected angular positions relative to said frame structure.

2. A unitary supplemental toeboard for a vehicle having a seat, a substantially horizontal fixed floorboard and a fixed toeboard upwardly inclined from said floorboard and spaced forwardly of said seat, said supplemental toeboard comprising a frame structure having a U-shaped forward portion and a substantially straight rear portion extending between the ends of said forward U-shaped portion and adjustably removably secured thereto, the intermediate base of said U-shaped portion being seated on said fixed toeboard, the ends of said U-shaped portion being bent to extend substantially parallel to the fixed floorboard to seat said straight rear portion on said fixed floorboard whereby to firmly position said frame structure relatively complementary to said fixed floorboard and fixed toeboard, a substantially rectangular flat toeboard tread member constructed approximately of the same dimensions as said frame structure and hinged to said straight rear portion to overlie said frame structure, and an adjustable support member carried by the intermediate base of said U-shaped portion and selectively secured to the edge of said toeboard tread member remote from the hinge, said support member being selectively adjustable to vary the angular position of said tread member with respect to said frame structure.

3. A unitary supplemental toeboard for a vehicle having a seat, a substantially horizontal fixed floorboard and a fixed toeboard upwardly inclined from said floorboard and spaced forwardly of said seat, said supplemental toeboard comprising a frame structure having a U-shaped forward portion and a substantially straight rear portion extending between the ends of said forward U-shaped portion and adjustably removably secured thereto, the intermediate base of said U-shaped portion being seated on said fixed toeboard, the ends of said U-shaped portion being bent to extend substantially parallel to the fixed floorboard to seat said straight rear portion on said fixed floorboard whereby to firmly position said frame structure relatively complementary to said fixed floorboard and fixed toeboard, a substantially rectangular flat toeboard tread member constructed approximately of the same dimensions as said frame structure and hinged to said straight rear portion to overlie said frame structure, and an adjustable support member carried by the intermediate base of said U-shaped portion and selectively secured to the edge of said toeboard tread member remote from the hinge, said support member being selectively adjustable to vary the angular position of said tread member with respect to said frame structure, said frame structure straight rear portion being selectively adjustable relative to said U-shaped portion toward and away from said vehicle seat to selectively vary the horizontal distance between the tread portion hinge and the seat.

4. A unitary supplemental toeboard for a vehicle having a seat, a substantially horizontal fixed floorboard and a fixed toeboard upwardly inclined from said floorboard and spaced forwardly of said seat, said supplemental toeboard comprising a frame structure having a U-shaped forward portion and a substantially straight rear portion extending between the ends of said forward U-shaped portion and adjustably removably secured thereto, the intermediate base of said U-shaped portion being seated on said fixed toeboard, the ends of said U-shaped portion being bent to extend substantially parallel to the fixed floorboard to seat said straight rear portion on said fixed floorboard whereby to firmly position said frame structure relatively complementary to said fixed floorboard and fixed toeboard, a substantially rectangular flat toeboard tread member constructed approximately of the same dimensions as said frame structure and hinged to said straight rear portion to overlie said frame structure, and an adjustable support member carried by the intermediate base of said U-shaped portion and selectively secured to the edge of said toeboard tread member remote from the hinge, said support member being selectively adjustable to vary the angular position of said tread member with respect to said frame structure, said support member comprising a rod element hinged to said U-shaped portion and arranged to be disconnected from said tread member and to fold inward between said frame structure and said tread member.

5. A unitary supplemental toeboard for a vehicle having a seat, a substantially horizontal fixed floorboard and a fixed toeboard upwardly inclined from said floorboard and spaced forwardly of said seat, said supplemental toeboard comprising a frame structure having a U-shaped forward portion and a substantially straight rear portion extending between the ends of said forward U-shaped portion and adjustably removably secured thereto, the intermediate base of said U-shaped portion being seated on said fixed toeboard, the ends of said U-shaped portion being bent to extend substantially parallel to the fixed floorboard to seat said straight rear portion on said fixed floorboard whereby to firmly position said frame structure relatively complementary to said fixed floorboard and fixed toeboard, a substantially rectangular flat toeboard tread member constructed approximately of the same dimensions as said frame structure and hinged to said straight rear portion to overlie said frame structure, and an adjustable support member carried by the intermediate base of said U-shaped portion and selectively secured to the edge of said toeboard tread member remote from the hinge, said support member being selectively adjustable to vary the angular position of said tread member with respect to said frame structure, said support member comprising an actuator having an arm connected to said tread member, said arm being selectively axially extendable in a direction substantially normal to the plane of said U-shaped member to selectively alter the distance between the base of said U-shaped portion and the aforesaid edge of said tread member.

References Cited in the file of this patent

UNITED STATES PATENTS

| | | |
|---|---|---|
| 826,862 | Little | July 24, 1906 |
| 956,681 | Clarke | May 3, 1910 |
| 1,268,811 | Balmos | June 11, 1918 |
| 1,496,284 | Amsden | June 3, 1924 |
| 1,544,258 | McMaster | June 30, 1925 |
| 2,654,420 | Rogers | Oct. 6, 1953 |